United States Patent

[11] 3,630,157

| [72] | Inventor | Ture Janneson Ortenblad<br>Brodragatan 30, S-412 74, Goteborg, Sweden |
|---|---|---|
| [21] | Appl. No. | 829,881 |
| [22] | Filed | June 3, 1969 |
| [45] | Patented | Dec. 28, 1971 |
| [32] | Priority | Feb. 6, 1969 |
| [33] | | Sweden |
| [31] | | 1633/69 |

[54] PALLET
4 Claims, 8 Drawing Figs.

[52] U.S. Cl. .................................................. 108/53, 108/58
[51] Int. Cl. ...................................................... B65d 19/18
[50] Field of Search .......................................... 108/51–58

[56] References Cited
UNITED STATES PATENTS

| 3,308,771 | 3/1967 | Wetten........................... | 108/51 |
| 3,120,825 | 2/1964 | Johnson......................... | 108/51 |
| 3,187,691 | 6/1965 | Leitzel........................... | 108/58 |
| 3,167,341 | 1/1965 | Higgins.......................... | 108/58 X |
| 3,228,358 | 1/1966 | Sepe et al. .................... | 108/58 |
| 3,247,810 | 4/1966 | Sepe et al. .................... | 108/53 |
| 3,277,849 | 10/1966 | Talbot........................... | 108/58 |
| 3,424,110 | 1/1969 | Toot.............................. | 108/53 |
| 3,359,929 | 12/1967 | Carlson......................... | 108/58 |

Primary Examiner—Bobby R. Gay
Assistant Examiner—Glenn O. Finch
Attorney—Amster & Rothstein ABSTRACT: An improved loading pallet is constructed with a carrier platform of compression moldable or castable material having a plurality of boxlike recesses, the sidewalls of which converge toward the bottom of each recess. The pallets are adapted to be stacked for storage or shipment with the boxlike recesses of each pallet being received within the recesses of the pallet immediately below and receiving the recesses of the pallet immediately above.

INVENTOR.
TURE J. ORTENBLAD
BY Amster & Rothstein
ATTORNEYS

INVENTOR.
TURE J. ORTENBLAD
BY
ATTORNEYS

PALLET

The present invention relates to a pallet which is suited for loading goods, preferably processed products, particularly by means of a fork truck, and/or for transporting them from the sender to the receiver. The receiver can then return the pallets to the sender immediately or else use them in storing the goods as well as for internal transports, and later return the pallets in bulk to the receiver. Furthermore, pallets belonging to a road haulage or transport company, railroad company, etc. could be circulated all around the country and thus used in the company transport network.

The most well-known pallet comprises a supporting plate or platform made of boards, which is supported by means of wooden blocks reposing in turn on boards. Such a construction naturally is very space consuming and difficult to handle, which is a great disadvantage, particularly when it comes to returning the pallets. When the pallets are to be returned or stored they are piled one on top of the other to form a stack and it is often difficult to obtain a stack that is stable and regular. These known pallets are also often exposed to damage and broken and the boards thereafter used for other purposes.

To eliminate the above-described drawbacks, the present invention provides a pallet which is characterized by a carrier platform of compression moldable or castable material, preferably plastic, said platform being provided with a number of boxlike recesses, the sidewalls of which converge towards the bottom of the recess.

Pallets manufactured in accordance with the invention will be easy to stack and each pallet, when stacked, occupies a vertical space only which is equal to the height of the supporting or reinforcement edge extending peripherally around each pallet. Furthermore, the recesses serve as guides to prevent individual turning or transverse movement of the pallets in the stack.

The invention will be described and explained more in detail in the following, with reference to the accompanying drawings. In the drawings.

Figure 1:
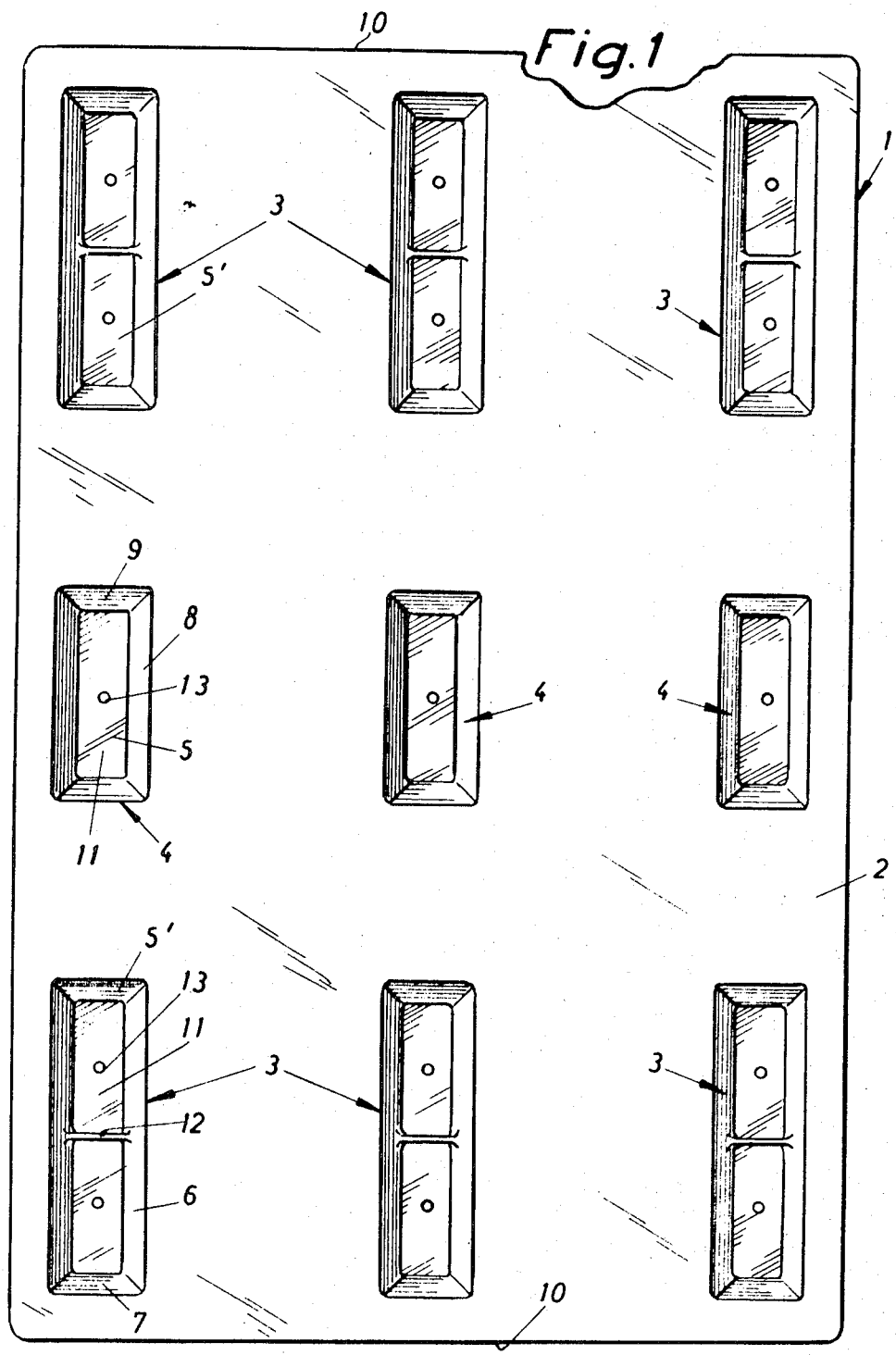
FIG. 1 is a top elevation of a pallet in accordance with the invention.

With reference to FIG. 1, the pallet 1 is formed of a rectangular carrier platform 2 having boxlike recesses 3, 4. These boxlike recesses 3, 4 have their sidewalls 6, 7, 8, and 9 converging towards the recess bottom 5, 5'. The recesses 3, 4 in the pallet are arranged equidistantly in the longitudinal as well as in the transverse direction, grouped in rows of three, so that the forks of a fork truck can pass underneath the carrying platform 2 from any side. Similarly, when the loading is being carried out by means of a fork moving on rollers on the floor the same result is achieved. The recesses 3 positioned adjacent the short sides 10 of the pallet 1 are bigger and consequently have a larger bottom surface 5' than the middle row of recesses 4. The larger recesses 3 are for this reason formed at their bottom 5' with a transverse upright supporting or reinforcement rim 12 which both reinforces the bottom 5' and serves as a supporting surface when the pallets 1 are stacked on top of each other. FIG. 1 also shows that the bottoms 5, 5' of the recesses 3, 4 are provided with drainage openings 13 to leadway water and the like.

Figure 2:
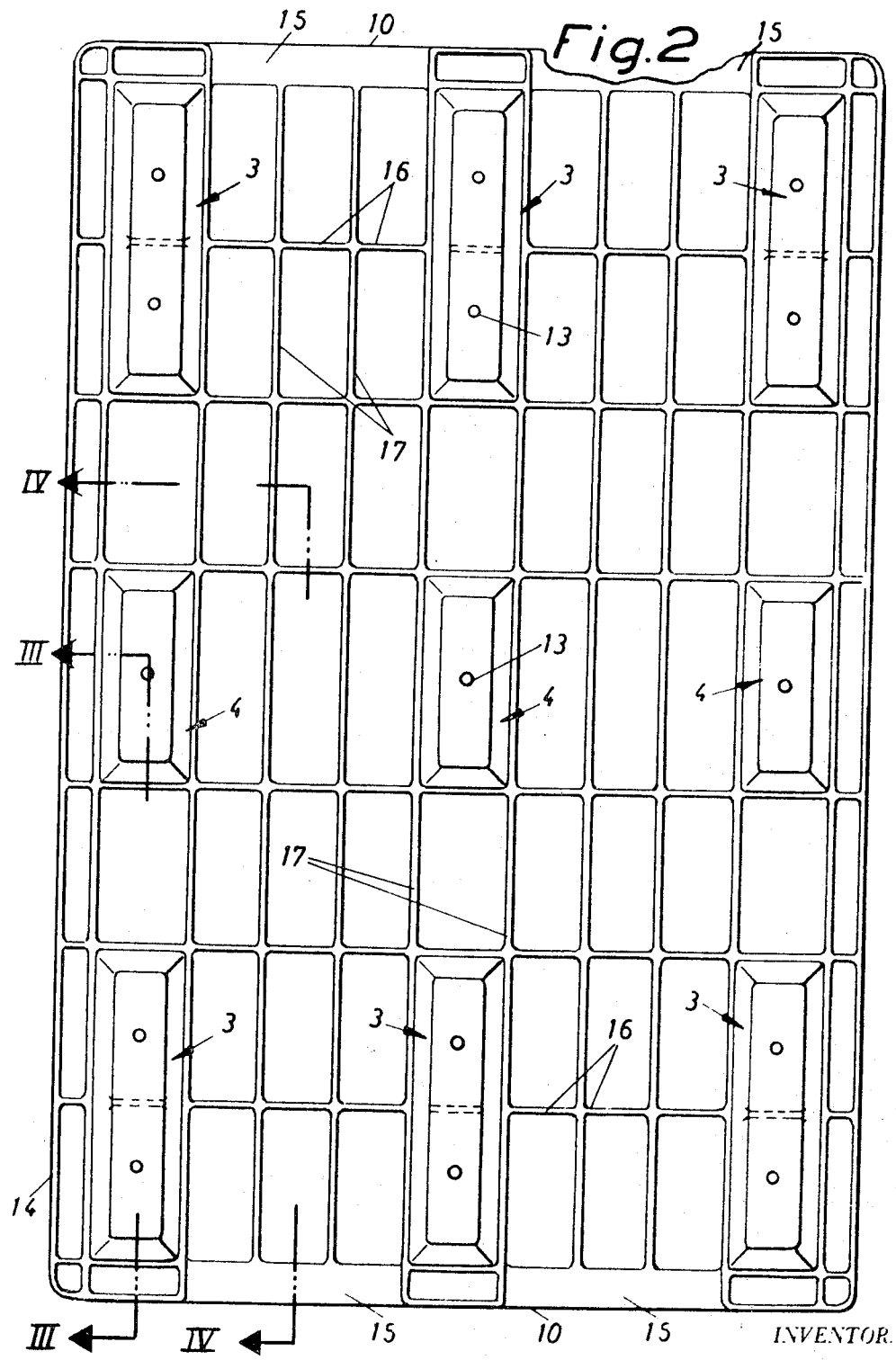
FIG. 2 is a view from beneath of said pallet.
Figure 6:
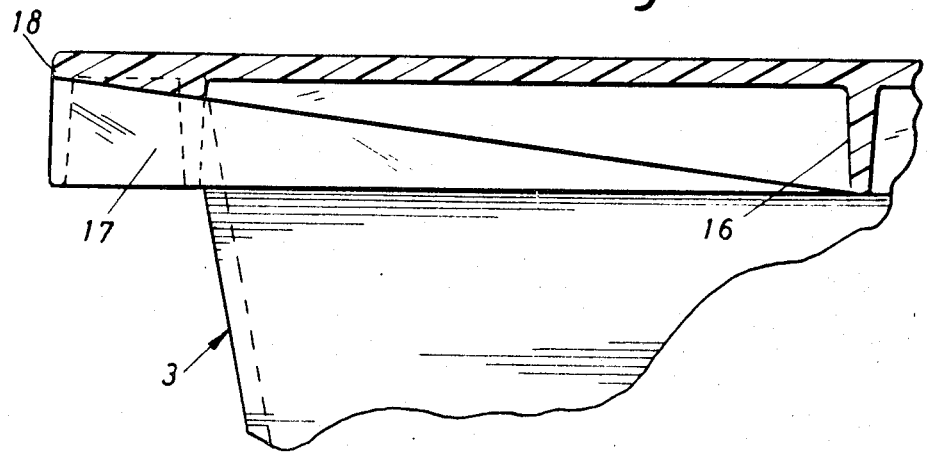
FIG. 6 shows on a larger scale a part of the section view of FIG. 3.

FIG. 2 shows the pallet 1 in accordance with the invention from below and as appears from this FIG. the underside of the pallet 1 is provided with a depending support and reinforcement edge 14 extending peripherally around the pallet. At each end of the short sides 10 of the pallet this edge 14 is provided with two notches 15, more clearly illustrated in FIGS. 4 and 6. FIG. 2 further shows that the underside of the pallet 1 is provided with a number of transverse and longitudinal supporting and reinforcement ribs 16, 17 which both serve as reinforcements of the carrier platform 2 and as supporting surfaces in the stacked condition of the pallets 1.

Figure 3:
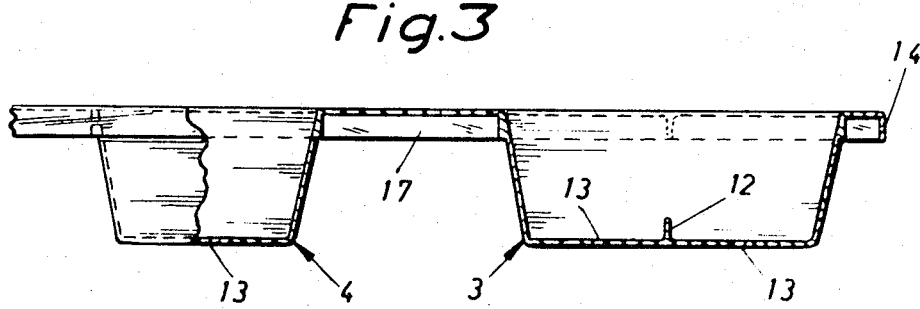
FIG. 3 is a section through the pallet along line III—III in FIG. 2.

From the section shown in FIG. 3, along line III—III in FIG. 2, appears that the transverse sidewalls 7, 9 of the boxlike recesses 3, 4 converge towards the bottom 5, 5'. It also appears from the partly broken end view in FIG. 5 that the longitudinal sidewalls 6, 8 converge towards the bottom 5, 5'. This allows the pallets 1 to be stacked on top of each other.

Figure 4:
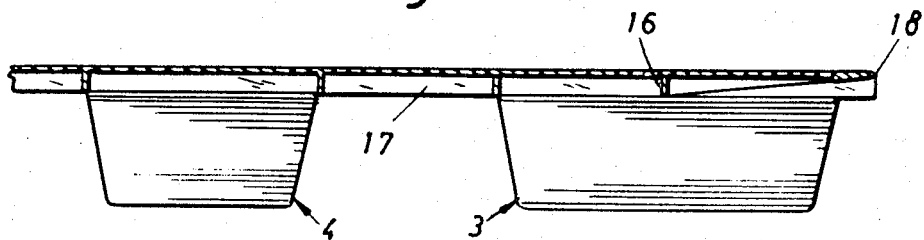
FIG. 4 is a section through one pallet along line IV—IV in FIG. 2.

The section illustrated in FIG. 4 along line IV—IV of FIG. 2 shows that the height of the transverse supporting and reinforcement ribs 16 is equal to the height of the supporting and reinforcement edge 14 extending around the periphery of the pallet, which is advantageous when stacking the pallets 1.

From the section shown in FIG. 3, along line III—III IN FIG. 2, appears that the transverse sidewalls 7, 9 of the boxlike recesses 3, 4 converge towards the bottom 5, 5'. It also appears from the partly broken end view in FIG. 5 that the longitudinal sidewalls 6, 8 converge towards the bottom 5, 5'. This allows the pallets 1 to be stacked on top of each other.

The section illustrated in FIG. 4 along line IV—IV of FIG. 2 shows that the height of the transverse supporting and reinforcement ribs 16 is equal to the height of the supporting and reinforcement edge 14 extending around the periphery of the pallet, which is advantageous when stacking the pallets 1. The longitudinal supporting and reinforcement ribs 17, extending towards the notches 15 described above, decrease, as clearly appears from FIG. 6, in height and terminate at the upper edge 18 of the notches 15. These are necessary to enable, for instance, manual lifting of a number of pallets 1 from each stack. The supporting and reinforcement ribs 17 terminating in the notches 15 are shaped as indicated above in order to enable the forks of a fork truck to be inserted into the recesses 15 and beneath the pallet 1 when a number of pallets are to be lifted from a stack.

Figure 5:
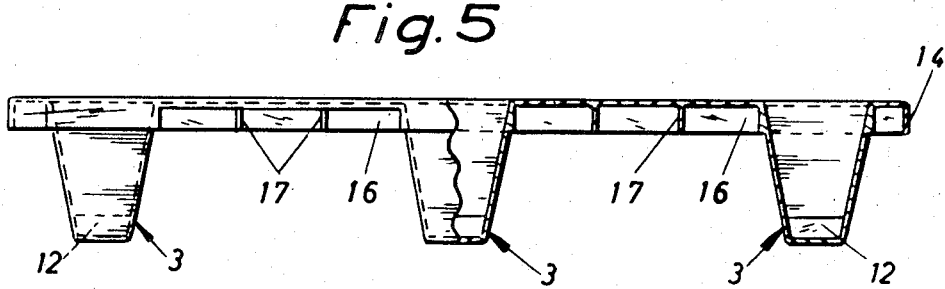
FIG. 5 is a partly broken end elevation of the pallet.
Figure 7:
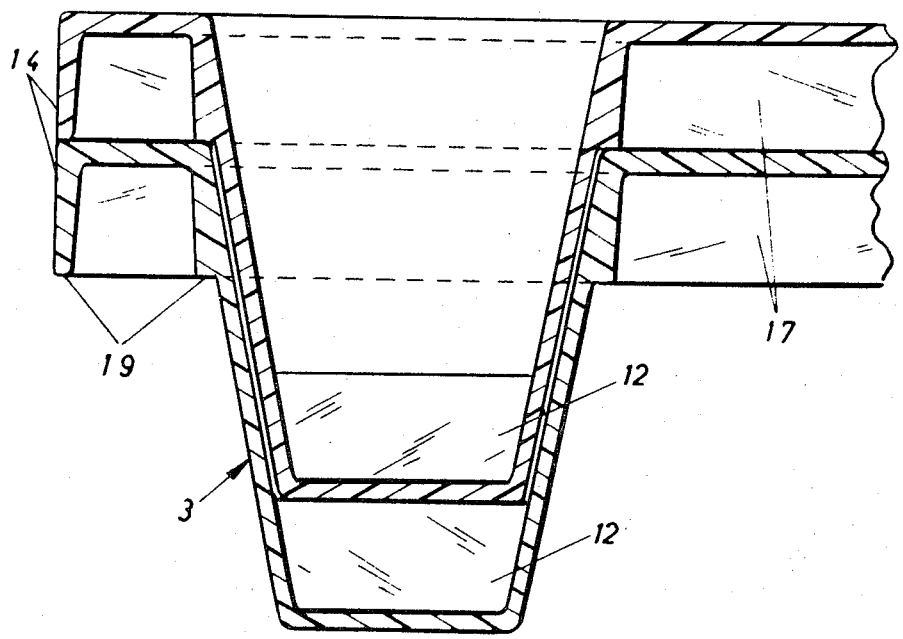
FIG. 7 shows on a larger scale a part of the section view of FIG. 4, two pallets being stacked one on top of the other.

FIG. 7 is a section of a corner portion of two pallets 1 nested in each other in accordance with FIG. 5, it being clearly shown that the sidewalls 6, 7, 8, 9 of the boxlike recesses 3, 4 are provided on their external face with depending flanges 19 positioned at such a level that when stacking the pallets 1 these flanges will rest against the carrier platform 2 of the immediately lower pallet. This eliminates every risk that the recesses 3, 4, when nested in each other during stacking, will be jammed together.

Figure 8:
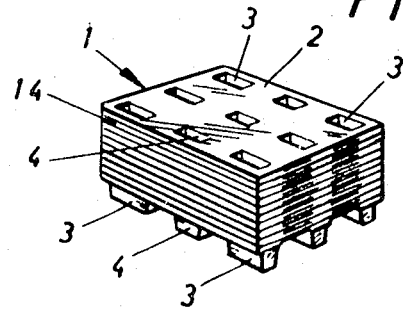
FIG. 8 is a perspective view as seen obliquely from above, of a number of pallets stacked one on top of the other.

FIG. 8 illustrates that when stacking a large number of pallets 1 a very compact pile is obtained which is very stable and prevents the pallets from turning or moving sidewise relatively reach other.

In normal operation, pallets 1 cooperate to carry the load between two immediately adjacent pallets 1 in stacked and reinforcement ribs 16 and 17, respectively, and the supporting and reinforcement edge 14, extending around the periphery of the pallet, rest on the carrier platform 2 of the immediately lower pallet 1. Furthermore, the flanges 19 at the recesses 3, 4 rest on the carrier platform 2, and the bottoms 5' of the boxlike recesses 3, 4 rest on the transverse supporting and reinforcement rim 12 in the bottom 5' of the recesses 3.

The pallet in accordance with the invention is made from compression moldable or castable material, such as, for instance, glass-fiber-reinforced plastic or compression molded wood filter material.

The invention is not limited to the embodiment shown and described herein but could be modified in several ways within the scope of the present invention. The carrier platform of the pallet could, for instance, be of circular shape for loading and transporting, for example, cylinder-shaped elements in upright position. The walls of the recesses 3, 4 could serve as guides for downwardly directed shoulders or the like arranged at the bottom of boxes or containers supported by the pallets and containing products of various kinds.

What is claimed is:

1. a pallet comprising a rectangular carrier platform of compression-moldable or castable material, said platform being formed with a number of boxlike indentations (3, 4) having their sidewalls converging towards the indentation bottoms (5), the lower face of said carrier platform presenting a number of supporting and reinforcing rims (16, 17) and a supporting and reinforcing edge (14) which extends peripherally around it and faces downwards, said supporting and reinforcing edge being formed, at least at one side of the carrier platform, with preferably two notches, (15) those of the supporting and reinforcing rims which extend towards said notches diminishing in height and opening at the upper edge of said notches, and a plurality of upright, supporting members (12) on said pallet, the position and height of said upright supporting member being chosen in such a way that when stacking the pallets, the indentations of pallets positioned on top of each other are prevented from being clamped by means of their walls against adjacent walls of the boxlike indentations of pallets positioned immediately therebelow.

2. A pallet as in claim 1, characterized in that the sidewalls of the boxlike indentations have downwardly facing shoulders on their external surfaces, said shoulders being arranged to rest on the carrier platform of the adjacent lower pallet, when the pallets are stacked on top of each other.

3. A pallet as in claim 1, characterized in that the supporting and reinforcing rims, merge with the shoulders on the indentations and with the peripheral supporting and reinforcement edge, said rims, shoulders and edges forming together a supporting surface for stacking the pallets with the boxlike indentations engaging in each other.

4. A pallet as in claim 1 wherein said upright supporting members are positioned at the bottom surface of said boxlike indentations.

* * * * *